(12) United States Patent
Livshits

(10) Patent No.: US 7,502,792 B2
(45) Date of Patent: Mar. 10, 2009

(54) MANAGING DATABASE SNAPSHOT STORAGE

(75) Inventor: Artem Yevgenyevich Livshits, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 272 days.

(21) Appl. No.: 11/411,549

(22) Filed: Apr. 26, 2006

(65) Prior Publication Data

US 2007/0255709 A1 Nov. 1, 2007

(51) Int. Cl.
  *G06F 7/00* (2006.01)
(52) U.S. Cl. .......................................... 707/8; 707/203
(58) Field of Classification Search .................... 707/8, 707/203
  See application file for complete search history.

(56) References Cited

U.S. PATENT DOCUMENTS

| | | | | |
|---|---|---|---|---|
| 4,627,019 A | * | 12/1986 | Ng | 707/8 |
| 5,956,731 A | * | 9/1999 | Bamford et al. | 707/201 |
| 6,237,001 B1 | * | 5/2001 | Bamford et al. | 707/100 |
| 7,103,588 B2 | * | 9/2006 | Beck et al. | 707/2 |
| 7,243,088 B2 | * | 7/2007 | Verma et al. | 707/1 |
| 2002/0103804 A1 | * | 8/2002 | Rothschild et al. | 707/10 |

* cited by examiner

*Primary Examiner*—Tim T Vo
*Assistant Examiner*—Anh Tai V Tran
(74) *Attorney, Agent, or Firm*—Workman Nydegger

(57) ABSTRACT

The present invention extends to methods, systems, computer program products, and data structures for managing database snapshot storage. Spatial properties database transactions are used to manage database snapshot storage allocation and reclamation. When a read transaction and subsequent write transactions refer to disjoint portions of a database, the read transaction can continue to read portions of data directly from the database. When a read transaction and subsequent write transactions refer to intersecting portions of a database, the read transaction can be transitioned to "snapshot" mode. The write transaction can publish a database snapshot can configure the read transaction to read contested portions of data from the published snapshot.

9 Claims, 6 Drawing Sheets

MANAGING DATABASE SNAPSHOT STORAGE

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, Web browsing, printing documents, database access, transaction management, etc.) include the communication (e.g., the exchange of electronic messages) between a number of computer systems and/or other electronic devices via wired and/or wireless computer networks.

In database environments, data is frequently accessed and manipulated using transactions. Transactions help insure that any related database operations either all occur or all do not occur. For example, when transferring money between bank accounts, a transaction would help insure that both a debit and a credit are performed or that no changes are made. Thus, errors, such as, for example, debiting one account without crediting the other account or vice versa can be avoided.

There are at least two typical kinds of transactions, read transactions and write (or update) transactions. A read transaction can be used to extract data from a database, and, for example, forward that data on to an application that will process the data. A write (or update) transaction can be used to alter (add, change, delete) data in a database.

Most database access systems implement what is commonly referred to as a two-phase commit protocol. A two-phase commit protocol enables a number of different components (e.g., as part of the same write transaction) to do some processing and agree on an outcome. The two-phase commit protocol also enables different components to be returned to their pre-transaction state when some error conditions occur. Since, a single transaction can span many different database components (e.g., even multiple databases), the two-phase commit protocol strategy is designed to ensure that either all the components are updated or none of them, so that the components remain consistent. That is, the two-phase commit protocol attempts to maintain the atomicity of transactions by executing transactions in two phases.

A first phase of a two-phase commit (e.g., a prepare phase) can include requesting and collecting votes. Components that are in a state (or that subsequently transition into a state) capable of performing operations requested in a prepare message (i.e., votes YES), indicate this capability back to the transaction manager by sending a prepare complete message to the transaction coordinator. A prepare complete message further indicates that a component will remain in a state capable of applying the requested operations even if the component subsequently fails. However, if any component does not respond or responds that it is not capable of performing operations according to the transaction (i.e., votes NO), the transaction manager may abort the transaction.

A second phase of a two-phase commit (e.g., a commit phase) can include communicating outcome and receiving outcome acknowledgements. In a commit phase (after a prepare phase is successful), the transaction manager sends results (e.g., a commit or abort message) to all components participating in the transaction (i.e., any component from which the transaction coordinator received a prepare complete message). Reception of results causes a component to perform or abort any operations that were indicated as being prepared in a previously corresponding prepare complete message. After a component successfully performs or aborts the indicated operations, the component sends an outcome acknowledgement message back to the transaction manager.

In a typical database access system there may be hundreds or thousands (or even more) transactions in various states of completion at any given time. Some of the various transactions can be read transactions and others can be write transactions. Further, depending on various factors, such as, for example, the involved applications, the data that is the subject of the transaction, etc., the time to complete a transaction can vary significantly (e.g., from a few milliseconds to a few seconds).

Thus, there is some potential for two transactions to conflict. For example, a more recent transaction may request access to data that is currently the subject of an existing, and longer running, transaction. When a conflict occurs, the newer transaction may be queued and then executed when the existing transaction completes. Alternately, some database access systems simply prevent newer transactions from being created if there is a data conflict (e.g., by locking data). Thus, the transaction is required to be recreated at a later time. These mechanisms help insure that database data is in a consistent state and that transactions access and manipulate appropriate data values.

However, neither of these solutions is optimal. The use of queues (especially in higher volume systems) can consume significant system resources. Further, both queues and preventing transaction can delay data access and data alterations from occurring. Accordingly, some techniques have been employed that differentiate between transaction type to allow more efficient data access and data alterations. One technique, snapshot isolation, permits non-blocking current read transactions and update transaction to occur together.

For example, at time $T_1$ a read transaction can be issued to read from a database having values $V_1$. At some subsequent time $T_2$, but before the read transaction is complete, a write transaction can be issued for changing the values $V_1$ to new values $V_2$. Instead of queuing or otherwise preventing the write transaction, a snapshot of the database having values $V_1$ is taken and the snapshot is stored in a location outside of the database. The read transaction is redirected to reading values $V_1$ from the snapshot. The write transaction is permitted to change the values $V_1$ to new values $V_2$. Thus, the read transaction is provided access with a consistent snapshot of the database (even if it isn't the most current), without preventing subsequently issued database alterations. The resources used to store a snapshot are freed up after a corresponding read transaction completes.

However, determining whether or not a snapshot is needed is based solely on the temporal aspects of the transactions. That is, each time a write transaction occurs before a longer running read transaction is completed; a snapshot of the database (consistent with the time a corresponding read transaction occurred) is stored. Determining whether or not snapshot storage can be reclaimed is also based solely on the temporal aspects of the transactions (e.g., the duration of a read transaction). That is, when a read transaction completes snapshot storage corresponding to the read transaction can be reclaimed.

Beneficially, snapshots facilitate more efficient execution of write transactions when prior read transactions have not completed. However, in a typical database system with thousands of writes per second, significant resources are needed to store snapshots. Further, some snapshots can be retained for relatively long periods of time before corresponding read transactions complete and corresponding resources can be freed up.

BRIEF SUMMARY

The present invention extends to methods, systems, computer program products, and data structures for managing database snapshot storage. In some embodiments, a read transaction, configured to read a first one or more portions of data from a database, is received. The read transaction is initialized to "live" mode to indicate that read transaction is configured to read data directly from the database. At least one of the first one or more portions of data is read directly from the database. A readset is populated with read references referencing any of the first one or more portions data read from the database by the read transaction.

A subsequent write transaction, including write references referencing the second one or more portions of data in the database, is received. The write transaction is configured to write a second one or more portions of data to the database. It is verified that the read transaction is in live mode in response to receiving the write transaction. The read references included in the readset to are compared to the write references included in the write transaction to determine if any portions of data previously read by the read transaction conflict with any portions of data referenced in the write transaction. How the read transaction accesses the first one or more portions of data is appropriately adjusted based on the results of the comparison.

In other embodiments, a write transaction, configured to write one or more portions of data to a database and including write references referencing the one or more portions of data in the database, is received. A list of reader views, each including one or more read references for a corresponding uncompleted read transaction, is accessed. Each read reference references a portion of data form the database that has been read by the corresponding uncompleted read transaction.

The write references are compared to any read references included in each reader view. It is determined that there is contention between the write transaction and at least one uncompleted read transaction for a portion of data in the database. A database snapshot for the at least one uncompleted read transaction is published. A reference to the published snapshot is added to the reader view for the at least one uncompleted read transaction.

In further embodiments, a read transaction, configured to read one or more portions of data from a database, is received. The read transaction is initialized to live mode to indicate that read transaction is configured to read data directly from the database. At least one portion of data from one or more portions of data is read directly from the database. The read transaction is transitioned from live mode to "snapshot" mode in response to detecting an actual data conflict with a subsequently issued write transaction in at least one location of the database. The snapshot reference provided by the write transaction is used to attempt to read any remaining portions of data from the one or more portions of data from a published snapshot of the database. The published snapshot having been published by the write transaction in response to detecting the actual data conflict in the at least one location of the database.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
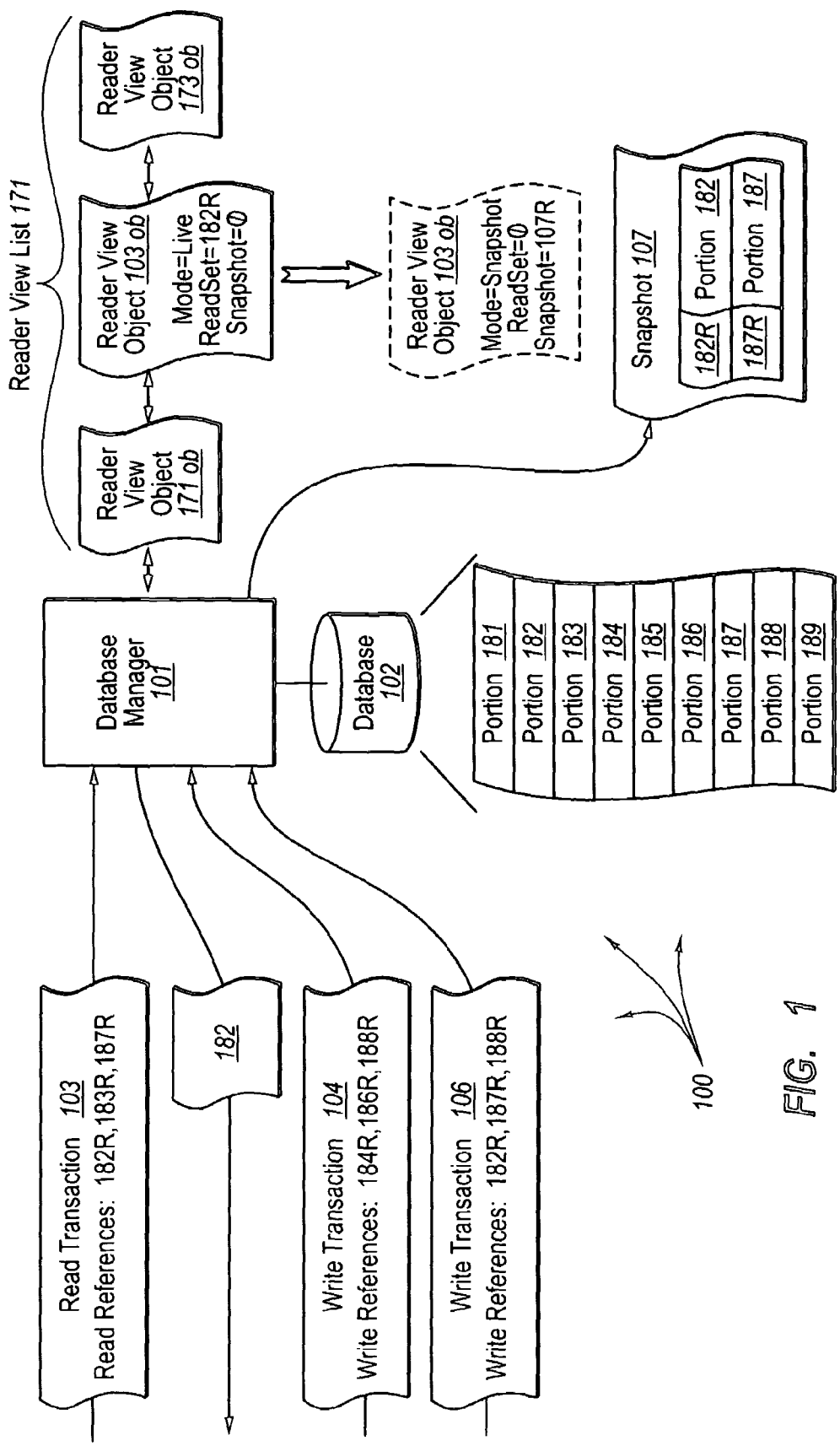
FIG. 1 illustrates an example computer architecture that facilitates managing database snapshot storage.

The present invention extends to methods, systems, computer program products, and data structures for managing database snapshot storage. In some embodiments, a read transaction, configured to read a first one or more portions of data from a database, is received. The read transaction is initialized to "live" mode to indicate that read transaction is configured to read data directly from the database. At least one of the first one or more portions of data is read directly from the database. A readset is populated with read references referencing any of the first one or more portions of data read from the database by the read transaction.

A subsequent write transaction, including write references referencing the second one or more portions of data in the database, is received. The write transaction is configured to write a second one or more portions of data to the database. It is verified that the read transaction is in live mode in response to receiving the write transaction. The read references included in the readset to are compared to the write references included in the write transaction to determine if any portions of data previously read by the read transaction conflict with any portions of data referenced in the write transaction. How the read transaction accesses the first one or more portions of data is appropriately adjusted based on the results of the comparison.

In other embodiments, a write transaction, configured to write one or more portions of data to a database and including write references referencing the one or more portions of data in the database, is received. A list of reader views, each including one or more read references for a corresponding uncompleted read transaction, is accessed. Each read reference references a portion of data form the database that has been read by the corresponding uncompleted read transaction.

The write references are compared to any read references included in each reader view. It is determined that there is contention between the write transaction and at least one uncompleted read transaction for a portion of data in the database. A database snapshot for the at least one uncompleted read transaction is published. A reference to the published snapshot is added to the reader view for the at least one uncompleted read transaction.

In further embodiments, a read transaction, configured to read one or more portions of data from a database, is received. The read transaction is initialized to live mode to indicate that read transaction is configured to read data directly from the database. At least one portion of data from one or more portions of data is read directly from the database. The read transaction is transitioned from live mode to "snapshot" mode in response to detecting an actual data conflict with a subsequently issued write transaction in at least one location of the database. The snapshot reference provided by the write transaction is used to attempt to read any remaining portions of data from the one or more portions of data from a published snapshot of the database. The published snapshot having been published by the write transaction in response to detecting the actual data conflict in the at least one location of the database.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates managing database snapshot storage. Each of the depicted components connected to a network, such as, for example, a Local Area Network ("LAN"), a Wide Area Network ("WAN"), or even the Internet. Thus, the various components can receive data from and send data to each other, as well as other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), etc.) over the network.

Components can also exchange transaction related messages using transaction protocols, such as, for example, commit protocols, recovery protocols, and termination protocols. In some embodiments, commit protocols are implemented as Atomic Commit Protocols ("ACP"), such as, for example, a two-phase commit protocol.

As depicted in computer architecture 100, database manager 101 is configured to receive read transactions and write transactions (e.g., from applications) that request access to portions of database 102. Based on previously received and/or uncompleted transactions, database manage 101 can permit and/or adjust other received and/or uncompleted transactions' access to portions of database 102. The smallest individually accessible portion of storage space in database 102 can be of varied granularity. For example, portions 181 through 189 can be pages (e.g., 4K or 16K chunks of data), records, attributes, etc.

Generally, when a read transaction is received, database manager 101 creates a reader view object for the read transaction. A reader view object can store various portions of data indicating the status of a received read transaction. In some embodiments, a reader view object is a data structure including one or more fields that store name/value pairs. The following pseudo code is an example data structure for a read transaction reader view object:

```
struct{
    Mode_Flag;
    Readset;
    Snapshot_Set;
    Prev_Pointer;
    Next_Pointer;
    Lock_Object;
}
```

Values for Mode_Flag can indicate the mode, such as, for example, live mode or snapshot mode, of a corresponding read transaction. For example, a "live" value indicates that the corresponding read transaction is in live mode, and thus, is reading live data from database 102. On the other hand, a "snapshot" value indicates that the corresponding read transaction is in snapshot mode, and thus, is reading data from a snapshot of database 102.

Values for a Readset can include a set of references (e.g., page numbers, record keys, etc.) that the corresponding read transaction has read. A set of references can be virtually any implementation of a set. For example, a Readset can include a hash table that stores page numbers of all pages a corresponding read transaction has read. Alternately, a Readset can include a balanced tree of values. In some embodiments, values in a ReadSet are a less precise implementation of a set. For example, a ReadSet may include more database portions (e.g., pages, records, etc.) than were actually read, such as, for example, a low value and a high value indicating a range of database portions (e.g., a page number range, a record key range, etc.), even though some database portions in the range were not read.

Values for a Snapshot_Set can include a set of references (e.g., page numbers, record keys, etc.) to old versions of database portions that a read transaction is to read. For example, a Snapshot_Set can include a hash map that maps references (e.g. page numbers, record keys, etc.) to a portion of memory that includes the contents of old versions of database portions (e.g., pages, records, etc).

In some embodiments, read transactions keep references to old versions of database portions that the read transaction has read and/or that the read transaction is to read. In these embodiments, the same old version of a page can be referenced by several read transactions. In other embodiments, old versions can be tagged with a start time of the write transaction that updated them. Read transactions can then find the version they are to read based on the start time. That is, reads transactions can read the latest version that is tagged with a time earlier than the start time for the read transaction.

When a reader view object is created, it can be placed in double-linked list that includes a plurality of (and potentially all) other reader view objects for a database. A value for Prev_Pointer can be a pointer that points to the preceding reader view object in the double-linked list from the perspective of a reader view object. On the other hand, a value for Next_Pointer can be a pointer that points to the subsequent reader view object in the double-linked list from the perspective of the reader view object. Database manager 101 can assign Prev_Pointer and Next_Pointer. values for reader view objects inserted into list 171.

A value for Lock_Object can be a data that indicates if the reader view object is locked by a transaction. When a reader view object is locked by a transaction, the transaction can be given access to data within the reader view object. For example, a transaction that locks a reader view object can then manipulate data within a reader view object, such as, for example, the Mode_Flag, Readset, and Snapshot_Set, of the reader view object. When one transaction has locked a reader view object, other transactions can be prevented from access data within the reader view object. For example, database manger 101 can track reader view object locks to prevent duplicate access reader view objects.

Upon creation, created reader view objects can be initialized to "live" mode, with both Readset and Snapshot_Set being empty. Created reader view objects can then be inserted into a double-linked list of reader view objects for a database in accordance with Prev_Pointer and Next_Pointer values.

Figure 2:
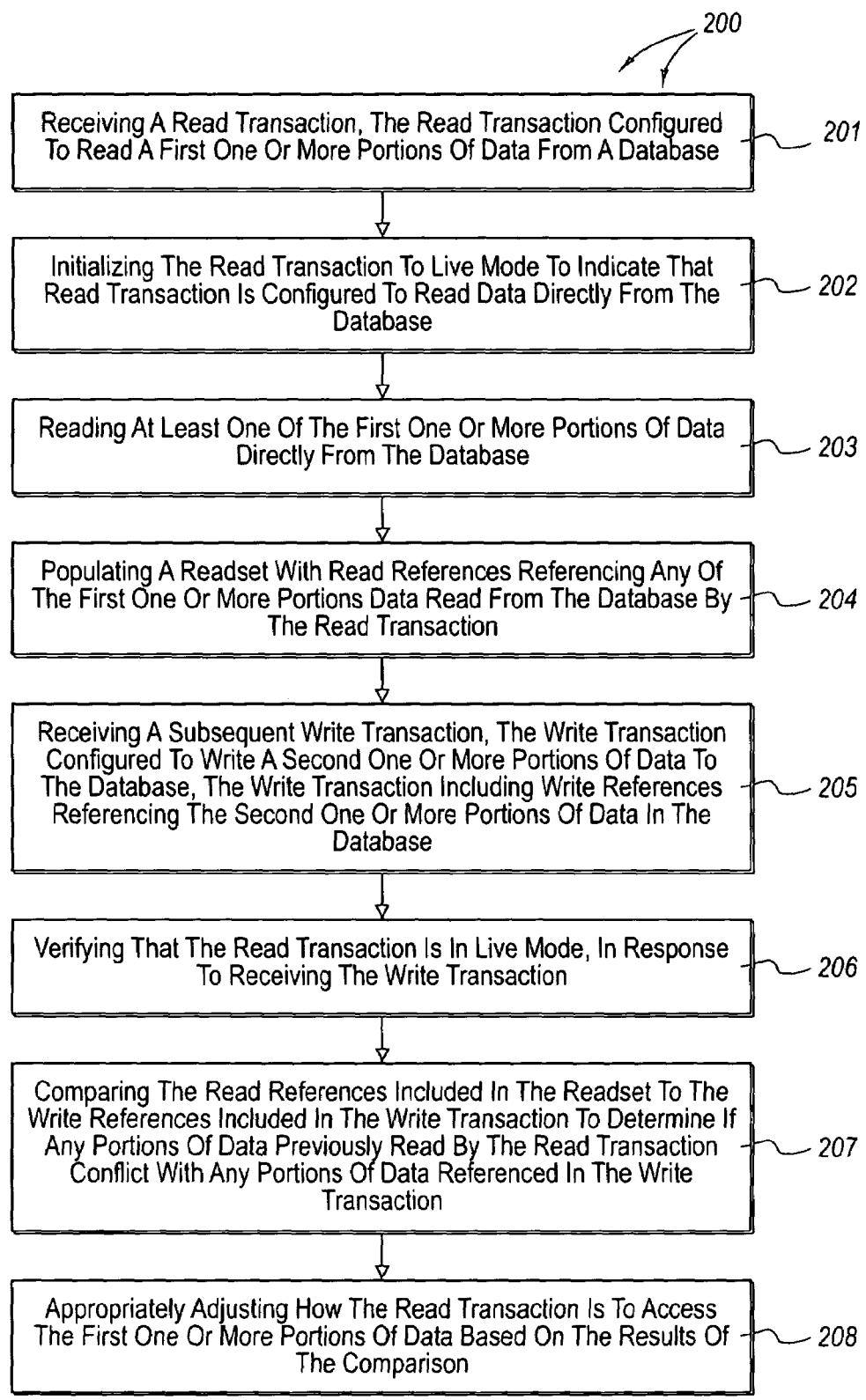
FIG. 2 illustrates a flow chart of an example method for configuring a read transaction's access to database data.

FIG. 2 illustrates a flow chart of an example method 200 for reclaiming snapshot storage. The method 200 will be described with respect to the components and data depicted in computer architecture 100.

Method 200 includes an act receiving a read transaction, the read transaction configured to read a first one or more portions of data from a database (act 201). For example, database manager 101 can receive read transaction 103. Read transaction 103 includes references 182R, 183R, and 187R, indicating that read transaction 103 is to read portions 182, 183, and 187 respectively. In response to receiving read transaction 103, database manager 101 can create read view object 103 Ob.

Method 200 includes an act of initializing the read transaction to live mode to indicate that read transaction is configured to read data directly from the database (act 202). For example, database manager 101 can initially set read the mode value of view object 103 Ob to "live". Setting the mode value to "live" indicates that read transaction 103 is configured to read data directly from database 102.

Method 200 includes an act of reading at least one of the first one or more portions of data directly from the database (act 203). For example, read transaction 103 can read portion 182 from database 102. Method 200 includes an act of populating a readset with read references referencing any of the first one or more portions data read from the database by the read transaction (act 204). For example, database manager 101 can populate a Readset for read view object 103 Ob with reference 182R (a reference for portion 182).

Method 200 includes an act of receiving a subsequent write transaction, the write transaction configured to write a second one or more portions of data to the database and including write references referencing the second one or more portions of data in the database (act 205). For example, database manager 101 can receive write transaction 104. Write transaction 104 includes references 184R, 186R, and 188R, indicating that write transaction 104 is to update portions 184, 186, and 188 respectively. Alternately, database manager 101 can receive write transaction 106. Write transaction 104 includes references 182R, 187R, and 188R, indicating that write transaction 104 is to update portions 182, 187, and 188 respectively.

Method 200 includes an act of verifying that the read transaction is in live mode, in response to receiving the write transaction (act 206). For example, database manager 101 can refer to read view object 103 Ob to verify that read transaction 103 is in "live" mode, in response to receiving write transaction 104 or in response receiving write transaction 106.

Method 200 includes an act of comparing the read references included in the readset to the write references included in the write transaction to determine if any portions of data previously read by the read transaction conflict with any portions of data referenced in the write transaction (act 207). For example, if write transaction 104 is received, database manger 101 can compare reference 182R to references 184R, 186R, and 188R to determine if any portions of data read by read transaction 103 conflicts with any portions of data references in write transaction 104. Alternately, if write transaction 106 is received, database manger 101 can compare reference 182R to references 182R, 187R, and 188R to determine if any portions of data read by read transaction 103 conflicts with any portions of data references in write transaction 106.

Method 200 includes an act of appropriately adjusting how the read transaction is to access the first one or more portions of data based on the results of the comparison (act 208). Appropriately adjusting access can include retaining the current access to the first one or more portions of data. For example, based on a comparison of read references in reader view object 103 Ob and write references in write transaction 104, database manager 101 can determine that read transaction 103 and write transaction 104 are not in conflict. That is, even though write transaction 104 is to update database 102, the updated portions are not portions read transaction 103 is to read.

Thus, there is no spatial intersection between the portions read transaction 103 is to read and the portions write transaction 104 is to update. Accordingly, there is no actual conflict between the two transactions. As a result, read transaction 103 can remain in "live" mode and there is little, if any, need to allocate storage space for a snapshot (even though write transaction 104 was received subsequent to read transaction 103).

On the other hand, appropriately adjusting access can include changing the access mode for the read transaction. For example, based on a comparison of read references in reader view object 103 Ob and write references in write transaction 106, database manager 101 can determine that read transaction 103 and write transaction 106 are in conflict. That is, read transactions 103 has read portion 182 and write transaction 106 has requested a subsequent update to portion 182.

Thus, there is a spatial intersection between the portions read transaction 103 is to read and the portions write transaction 106 is to update. Accordingly, there is an actual conflict between the two transactions. As a result, read transaction 103 can be transitioned to "snapshot" mode. Along with transitioning read transaction 103 to snapshot mode, write transaction 106 can publish a snapshot of (at least the relevant portion of) database 102. In "snapshot" mode, read transaction 103 reads from a saved snapshot. Thus, write transaction 106 can update database 102 even though read transaction 103 is not completed.

Figure 3:
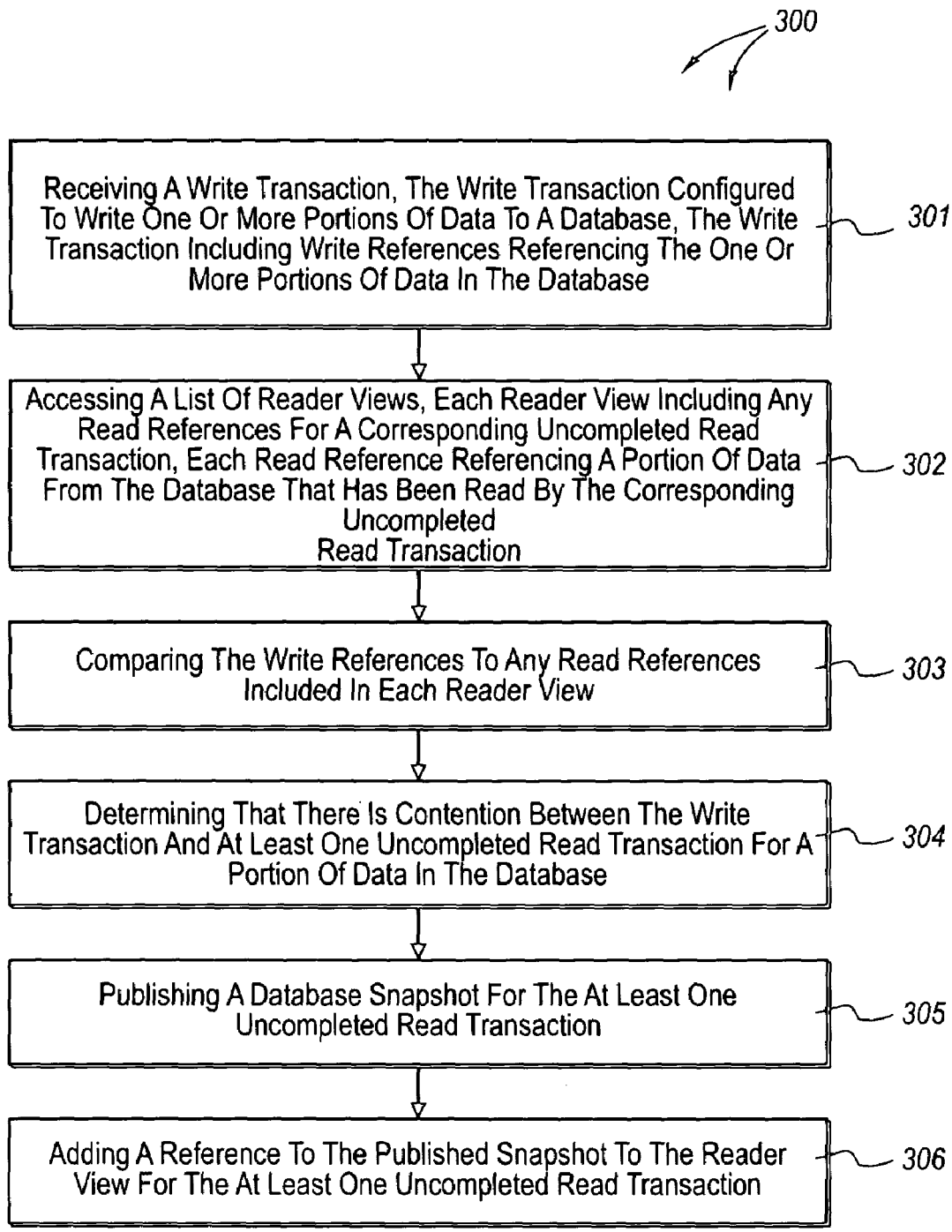
FIG. 3 illustrates a flow chart of an example method for configuring database access when a write transaction conflicts with a previous transaction.

FIG. 3 illustrates a flow chart of an example method 300 for adjusting database access when a write transaction conflicts with a previously issued transaction. The method 300 will be described with respect to the components and data depicted in computer architecture 100.

Method 300 includes an act of receiving a write transaction configured to write one or more portions of data to a database and including write references referencing the one or more portions of data in the database (act 301). For example, database manager 101 can receive write transaction 106. Write transaction 106 is configured to write data to portions 182, 187, and 188 as indicated by references 182R, 187R, and 188R respectively.

Method 300 includes an act of accessing a list of reader views, each reader view including any read references for corresponding uncompleted read transactions, each read reference referencing a portion of data from the database that has been read by the corresponding uncompleted read transaction (act 302). For example, database manager 101 can access reader view list 171 in response to receiving write transaction 106. View list 171 contains a reader view object for any uncompleted read transactions reading portions of database 102. Accordingly, each reader view can include one or more read references referencing portions of database 102.

Method 300 includes an act of comparing the write references to any read references included in each reader view (act 303). For example database manager 101 can compare references 182R, 187R, and 188R from write transaction 106 to read references in each reader view object of reader view list 171, including in reader view objects 171 Ob, 103 Ob, and 173 Ob. Thus, database manager 101 can compare write reference 182R from write transaction 104 to read reference 182R in reader view object 103 Ob (in the readset of reader view object 103 Ob).

Method 300 includes an act of determining that there is contention between the write transaction and at least one uncompleted read transaction for a portion of data in the database (act 304). For example, database manager 101 can determine that there is contention between write transaction 106 and read transaction 103 for portion 182. Method 300 includes an act of publishing a database snapshot for the at least one uncompleted read transaction (act 305). For example, database manager 101 can publish snapshot 107 for read transaction 103. Snapshot 107 can include values for at least any portions of database 102 that are under contention. For example, snapshot 107 can include values for portions 182 and 187 (the values prior to receiving write transaction 106), since write transaction 106 and read transaction 103 are contending (or will contend) for portions 182 and 187.

Method 300 includes an act of adding a reference to the published snapshot to the reader view for the at least one uncompleted read transaction (act 306). For example, database manager 101 can add reference 107R (a reference to snapshot 107) to the snapshot set for reader view object 103 Ob. Database manager 101 can also transition read transaction 103 to "snapshot" mode (by setting mode=Snapshot in reader view object 103 Ob) to indicate that read transaction 103 is to read at least some data from snapshot 107.

Snapshot 107 can include appropriate references to portions stored in snapshot 107. For example, snapshot 107 can include references 182R and 187R referencing portions 182 and 187 respectively. Thus, through snapshot reference 107R, read transaction 103 can refer to snapshot 107 to access stored portions of database 102. Alternately and as previously described, a Snapshot_Set can also include a set of references (e.g., page numbers, record keys, etc.) to old versions of database portions that a read transaction is to read.

Figure 4:
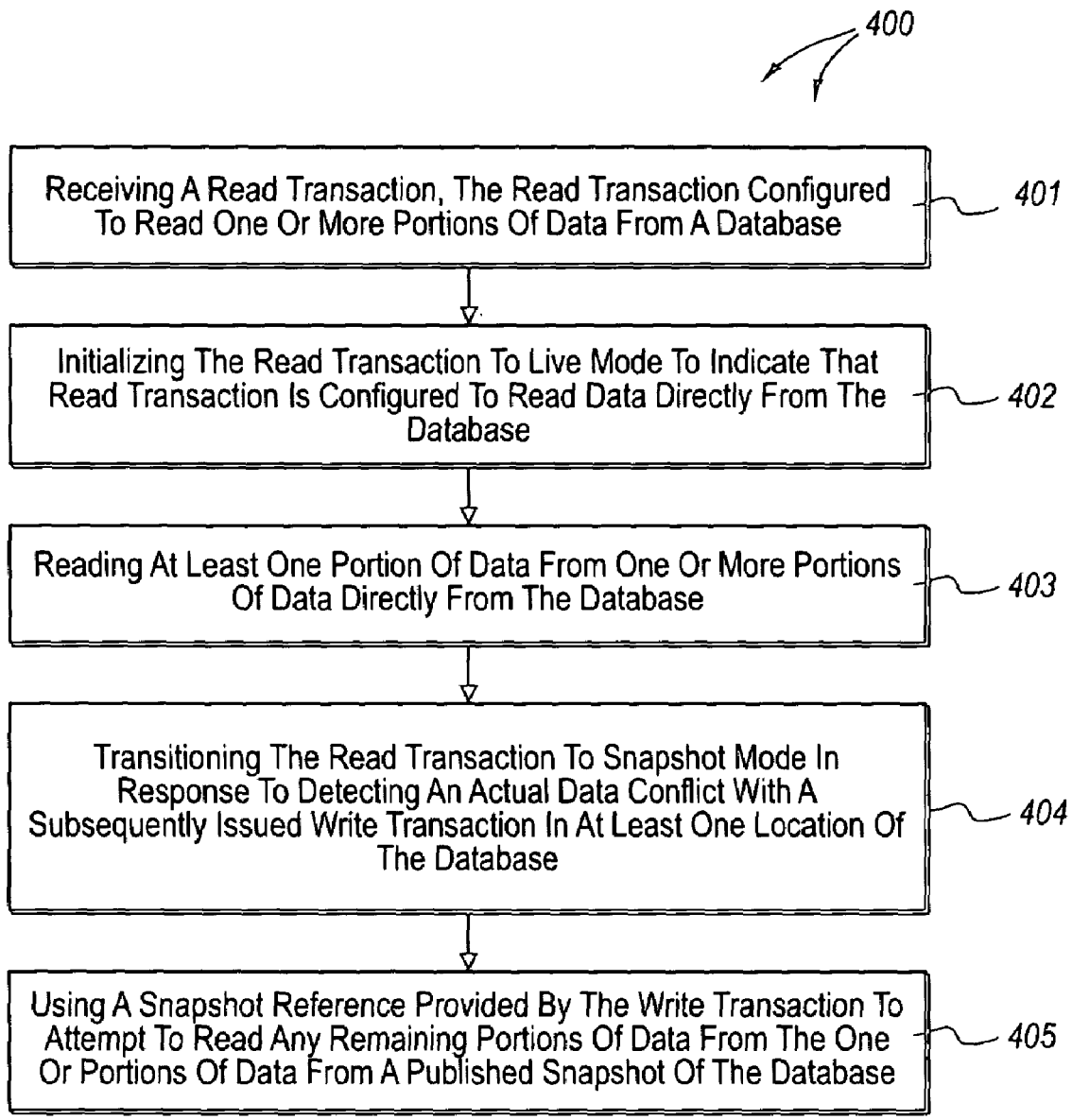
FIG. 4 illustrates a flow chart of an example method for a read transaction to read database data.

FIG. 4 illustrates a flow chart of an example method 400 for reading database data for a read transaction. The method 400 will be described with respect to the components and data depicted in computer architecture 100.

Method 400 includes an act of receiving a read transaction configured to read one or more portions of data from a database (act 401). For example, database manager 101 can receive read transaction 103. Method 400 includes an act of initializing the read transaction to live mode to indicate that read transaction is configured to read data directly from the database (act 402). For example, database manager 101 can initially set the mode value of view object 103 Ob to "live". Setting the mode value to "live" indicates that read transaction 103 is configured to read data directly from database 102.

Method 400 includes an act of reading at least one portion of data from one or more portions of data directly from the database (act 403). For example, read transaction 103 can read portion 182 from database 102. Method 400 includes an act of transitioning the read transaction to snapshot mode in response to detecting an actual data conflict with a subsequently issued write transaction in at least one location of the database. For example, database manager 101 can transition read transaction 103 to snapshot mode in response to detecting that read transaction 103 and subsequently received write transaction 106 are both requesting access to portions 182 and 187.

As previously mentioned, when transitioning to snapshot mode, a reference to a snapshot storage location can be included in the snapshot set for a read transaction. For example, reference 107R can be included to reference snapshot 107. A write transaction can publish a snapshot in response to detecting an actual data conflict in at least one location of the database. For example, write transaction 106 can publish snapshot 107 in response to conflicts for portions 182 and 187 and can provide reference 107R to database manager 101. Database manager 101 can then update reader view object 103 Ob to include reference 107R.

Method 400 includes an act of using snapshot reference provided by the write transaction to attempt to read any remaining portions of data from the one or portions of data from a published snapshot of the database (act 404). For example, read transaction 103 can refer to snapshot 107 to read portion 187. Although in "snapshot" mode, read transaction 103 can still refer directly to database 102 to access portions that are not in conflict. For example, after transitioning to snapshot mode, read transaction 103 can still access portion 183 directly from database 102.

Snapshot storage used to store portions of database 102 can be freed up (reclaimed) subsequent to the completion of read transactions. For example, upon completion of a read transaction that was transitioned to snapshot mode, portions of database 102 stored in a snapshot may no longer be needed. Thus, any references to the snapshot may no longer exist. Accordingly, snapshot storage used for the snapshot can be freed up (reclaimed).

In some embodiments, a reclamation attempt occurs after the completion of each write transaction. For example, after the completion of a write transaction, database manager 101 can enumerate reader view objects in reader view list 171. If no reader view objects reference a specified snapshot, the snapshot storage allocated for the snapshot can be reclaimed. That is, when any read transactions referencing a snapshot are completed, the storage used for the snapshot can be reclaimed.

Alternately, reclamation occurs asynchronously. For example, a dedicated task runs from time to time to determine which snapshots are to be retained and/or not retained. Snapshot storage for any snapshots that are not to be retained can be reclaimed.

Figure 5:
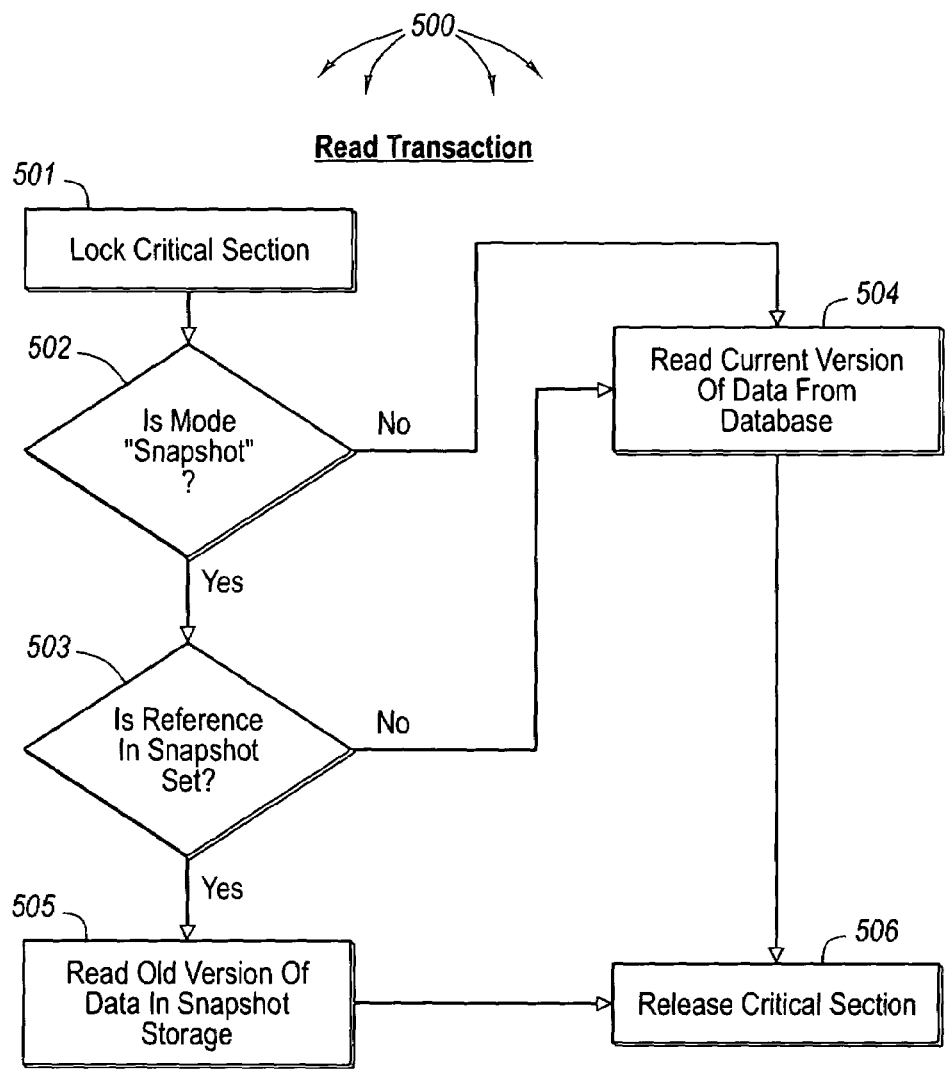
FIG. 5 illustrates a flow chart of another example method for a read transaction to read database data.

FIG. 5 illustrates a flow chart of another example method 500 for a read transaction to read database data. The method 500 will be described with respect to the components and data depicted in computer architecture 100. Method 500 can be utilized when a read transaction is to read a portion of data from a database.

Method 500 includes an act of locking a critical section of a reader object view (act 501). For example, read transaction 103 can lock a Lock Object for reader view object 103 Ob.

Method 500 includes an act of determining if the reader view object indicates "snapshot" mode (act 502). For example, database manager 101 can determine if reader view object 103 Ob indicates "snapshot" mode (for read transaction 103). When transaction 103 is not in snapshot mode (NO at act 502), method 500 includes an act of reading a current version of the portion of data from the database. For example, transaction 103 can read portion 182 directly from database 102.

When transaction 103 is in snapshot mode (YES at act 502), method 500 includes an act of determining if a reference to the portion of data is the snapshot set (act 503). For example, database manager 101 can determine that references for portions 182 and 187 are in snapshot 107 and that a reference for portion 183 is not in snapshot 107. When a reference to the portion of data is not in the snapshot set (NO at act 503), method 500 includes an act of reading a current version of the portion of data from the database. For example, transaction 103 can read portion 183 directly from database 102. When a reference to the portion of data is in the snapshot set (YES at act 503), method 500 includes an act of reading an older version of the portion of data from snapshot storage. For example, transaction 103 can read portion 182 and/or portion 187 from snapshot 107.

Method 500 includes an act of releasing the critical section (act 506). For example, read transaction 103 can release a Lock_Object for reader view object 103 Ob.

Figure 6:
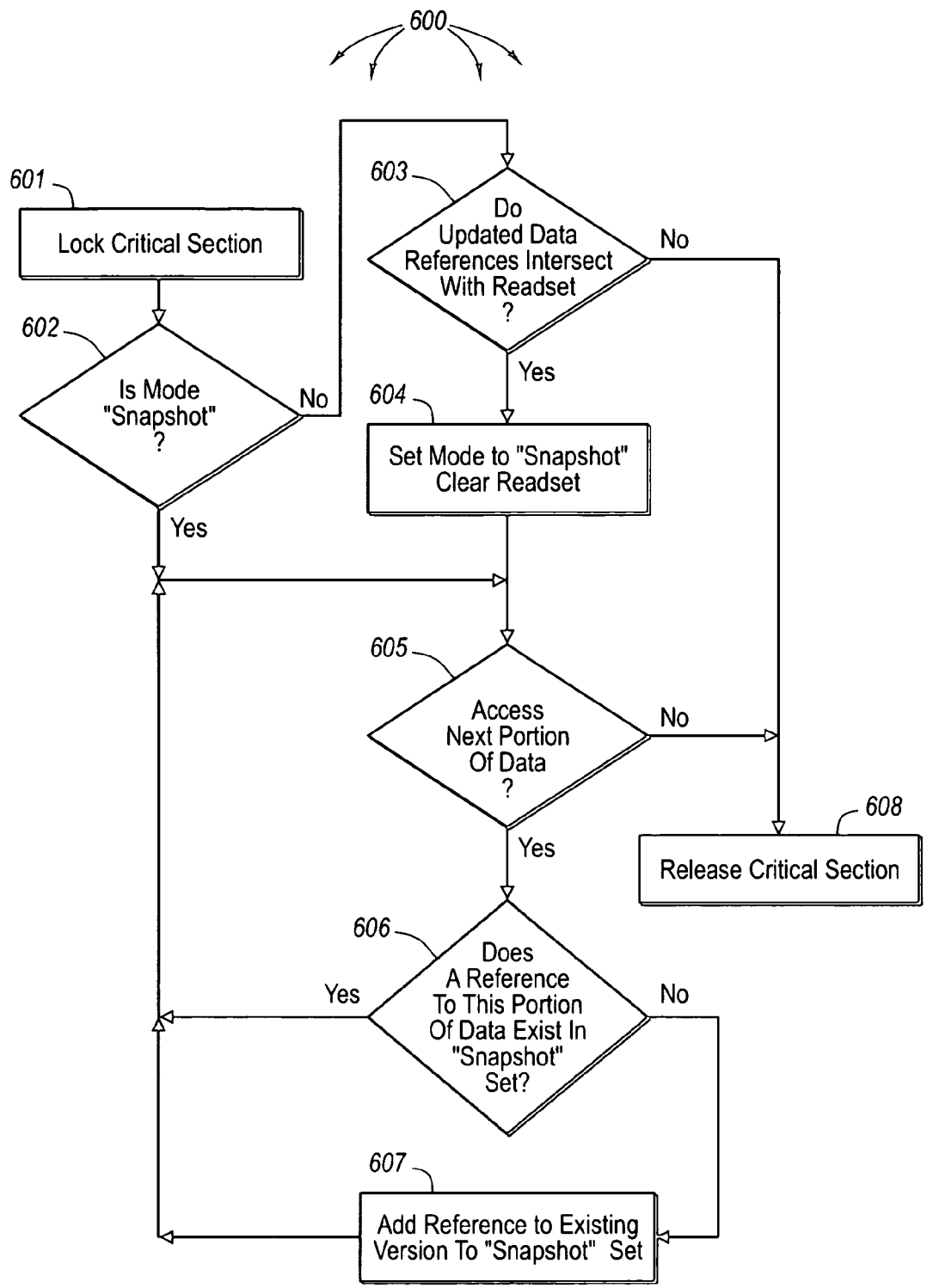
FIG. 6 illustrates a flow chart of an example method for determining if a data conflict exists.

FIG. 6 illustrates a flow chart of an example method 600 for determining if a data conflict exists. The method 600 will be described with respect to the components and data depicted in computer architecture 100. Method 600 can be utilized when a write transaction is to commit.

When a write transaction is to commit, the write transaction enumerates all reader view objects in a double-linked list for a database and publishes a snapshot of the database. For example, write transaction 106 can enumerate all of the reader object views in reader view list 171 and publish snapshot 107. Write transaction 106 can perform method 600 for each reader view object in reader view list 171

Method 600 includes an act of locking a critical section of a reader object view (act 601). For example, write transaction 104 or 106 can lock a Lock_Object for reader view object 103 Ob.

Method 600 includes an act of determining if the reader view object indicates a read transaction is "snapshot" mode (act 602). For example, database manager 101 can determine if reader view object 103 Ob indicates read transaction 103 is in "snapshot" mode. When a reader view object does not indicate "snapshot" mode (NO at act 602), method 600 includes an act of determining if updated data references intersect with a readset (act 603). For example, database manager 101 can determine if references 184R, 186R and 188R (for write transaction 104) or if references 182R, 187R, and 188R (for write transaction 106) intersect with the readset for reader view object 103 Ob.

When updated data references do not intersect with a readset (NO at act 603), method 600 transitions to act 608. For example, database manager 101 can determine that references in write transaction 104 and references in the readset for reader view object 103 Ob do not intersect. Accordingly, read transaction 103 can remain in "live" mode and is effectively re-ordered after write transaction 104.

When updated data references do intersect with a readset (YES at act 603), method 600 includes an act of setting the mode to indicate "snapshot" mode and clearing a readset (act 604). For example, database manager 101 can determine that references in write transaction 106 and references in the readset for reader view object 103 Ob do intersect. Accordingly, database manager 101 can set the mode of reader view object 103 Ob to indicate snapshot mode and can clear reader view object 103 Ob's readset.

When a reader view object does indicate "snapshot" mode (YES at act 602) or after a reader view object is set to indicate "snapshot" mode (after act 604), method 600 includes an act of determining if a next portion of data is to be accessed a next portion of data (act 605). For example, write transaction 106 can access portion 182 from database 102. When a portion of data is accessed (YES at act 605), method 600 includes an act of determining if the portion of data is referenced in the snapshot set (act 606). For example, database manager 101 can determine if portion 182 is referenced in snapshot 107.

When a portion of data is not referenced in the snapshot set (NO at act 606), method 600 includes an act of adding a reference to the existing versions of the portion of data to the snapshot (act 607). For example, database manager 101 can add 182R to snapshot 107. When a portion of data is referenced in the snapshot set (YES act 606) or after a reference for the portion of data is added (after act 607), method 600 transitions to act 605. If further portions of data (e.g., portions 187 and 188) exist, the portions are individually accessed and acts 606 and/or 607 are performed.

When a portion of data is accessed, that is no further portions are to be checked, (YES at act 605), method 600 transitions to act 608. Method 600 includes an act of releasing the critical section (act 608). For example, write transaction 104 or 106 can release a Lock_Object for reader view object 103 Ob.

After all reader views are enumerated, snapshot storage used by unreferenced versions of portions from database 102 can be reclaimed.

Accordingly, embodiments of the present invention can allocate and reclaim snapshot storage based on spatial properties of a database. However, a subsequent write transaction does not necessarily cause allocation of snapshot storage. For example, when a read transaction and subsequent write transaction refer to disjoint portions of a database a snapshot may not be necessary. Thus, snapshot storage resources can be conserved for other transactions that are in actual conflict or even for other purposes. Snapshot storage can also be reclaimed when old versions are no longer referenced (and thus there is no longer an intersection between references of a read transaction and references of write transaction).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a database management system, a method for configuring access to database data for a read transaction, the method comprising:
    an act of receiving a read transaction, the read transaction configured to read a first one or more portions of data from a database;
    an act of initializing the read transaction to live mode to indicate that the read transaction is configured to read data directly from the database;
    an act of reading at least one of the first one or more portions of data directly from the database rather than from a copy of a portion of the database;
    an act of populating a read_set with read references referencing any of the first one or more portions of data that are read from the database by the read transaction;
    an act of receiving a subsequent write transaction, the write transaction configured to write a second one or more portions of data to the database, the write transaction including write references referencing the second one or more portions of data in the database wherein the write transaction updates the second one or more portions of data in the database directly rather than updating copies of the one or more portions of data;
    an act of verifying that the read transaction is in live mode, in response to receiving the write transaction;
    an act of comparing the read references included in the read_set to the write references included in the write transaction to determine if any portions of data previously read by the read transaction conflict with any portions of data referenced in the write transaction; and
    an act of appropriately adjusting how the read transaction is to access the first one or more portions of data based on the results of the comparison such that:
        upon determining that no portions of data previously read by the read transaction conflict with any portion of data referenced in the write transaction, maintaining the read transaction in live mode such that the read transaction reads data directly from the database: and
        upon determining that one or more portions of data previously read by the read transaction conflict with any portion of data referenced in the write transaction, converting the read transaction from live mode to snapshot mode such that the read transaction reads the conflicting one or more portions of data from a copy of the conflicting one or more portions of data rather than reading the conflicting one or more portions of data directly from the database, and wherein the write transaction updates the conflicting one or more portions of data in the database directly rather than updating copies of the one or more portions of data.

2. The method as recited in claim 1, wherein the act of initializing the read transaction to live mode to indicate that read transaction is configured to read data directly from the database comprises:
    an act of creating a reader view object for the read transaction, the reader view object including a mode field configured to store a mode value indicating the mode of the read transaction; and
    an act of setting the mode value to live.

3. The method as recited in claim 1, wherein the act of populating a read_set with read references referencing any of the first one or more portions of data comprises an act of populating a hash table that stores page numbers of pages the transaction has read.

4. The method as recited in claim 1, wherein the act of populating a read_set with read references referencing any of the first one or more portions of data comprises an act of populating a balanced tree with references to any portions of data the read transaction has read.

5. The method of claim 1 further comprising, subsequent to converting the read transaction to snapshot mode, deleting the read references from the read set.

6. The method of claim 1 wherein a reference to each of the conflicting one or more portions of data is stored in a snapshot set such that the read transaction, upon detecting the reference, reads the corresponding portion of data from the copy rather than directly from the database.

7. The method of claim 6 wherein the read transaction, upon detecting that a reference to a portion of data that is to be read is not stored in the snapshot set, reads the corresponding portion of data directly from the database.

8. A computer readable storage media having stored thereon computer-executable instructions which when executed perform the method of claim 1.

9. A system comprising:
    a processor; and
    memory storing computer-executable instructions which when executed by the processor perform the method of claim 1.

* * * * *

UNITED STATES PATENT AND TRADEMARK OFFICE
CERTIFICATE OF CORRECTION

| | | |
|---|---|---|
| PATENT NO. | : 7,502,792 B2 | Page 1 of 1 |
| APPLICATION NO. | : 11/411549 | |
| DATED | : March 10, 2009 | |
| INVENTOR(S) | : Artem Yevgenyevich Livshits | |

It is certified that error appears in the above-identified patent and that said Letters Patent is hereby corrected as shown below:

In column 14, line 11, in Claim 1, delete "database:" and insert -- database; --, therefor.

Signed and Sealed this
Tenth Day of May, 2011

David J. Kappos
*Director of the United States Patent and Trademark Office*